Dec. 18, 1962 F. E. AHLBIN 3,069,038
BOAT TRAILER UNLOADER
Filed July 20, 1960 2 Sheets-Sheet 1

Dec. 18, 1962
F. E. AHLBIN
3,069,038
BOAT TRAILER UNLOADER
Filed July 20, 1960
2 Sheets-Sheet 2
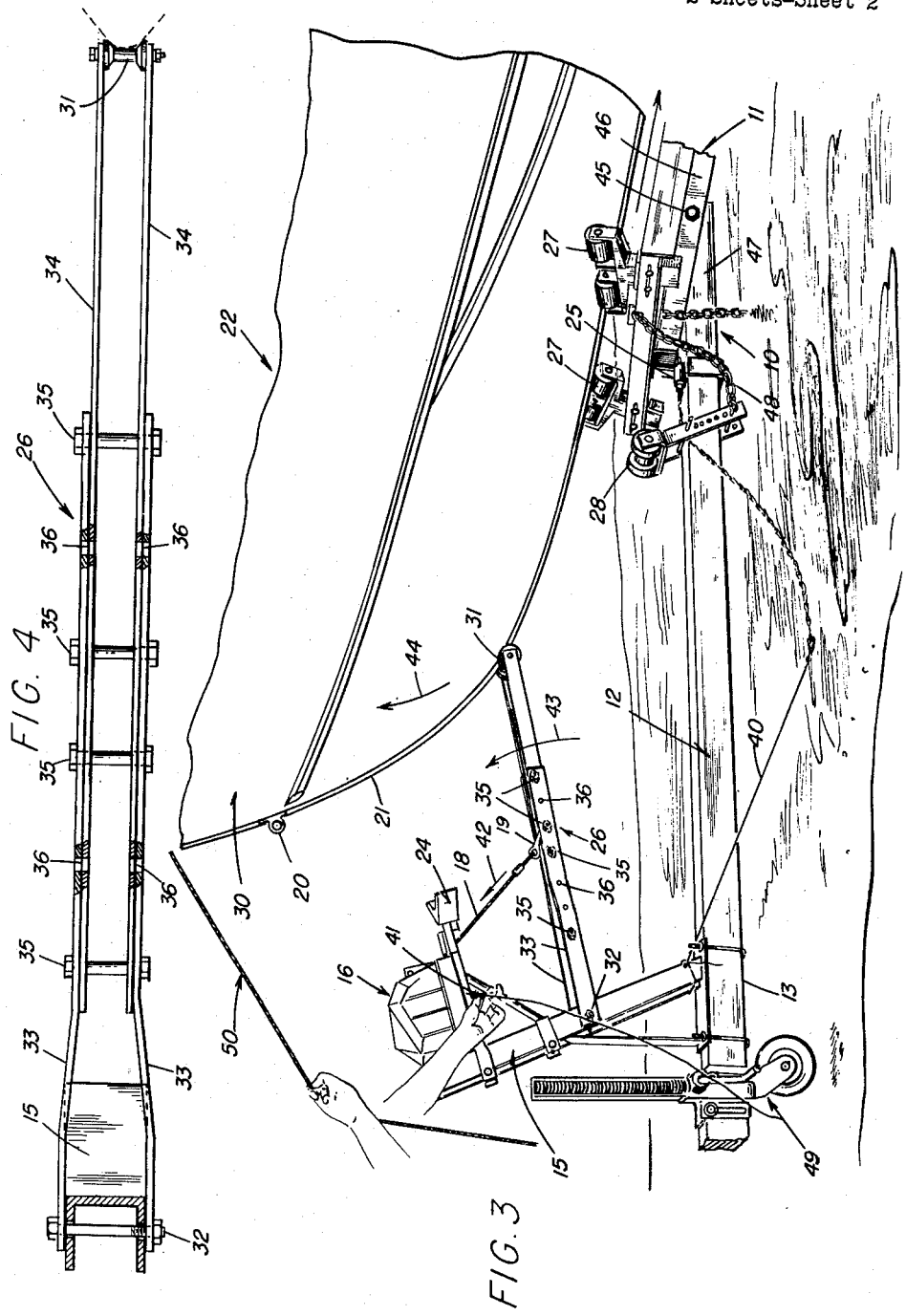

United States Patent Office 3,069,038
Patented Dec. 18, 1962

3,069,038
BOAT TRAILER UNLOADER
Fred E. Ahlbin, 3663 Congress St., Fairfield, Conn.
Filed July 20, 1960, Ser. No. 44,178
3 Claims. (Cl. 214—505)

The present invention relates to boat trailers which have wheel-supported bed frame structures upon which boats are to be cradled and tongue means extending forward therefrom to be hitched or coupled to hauling units, such as automobiles, and, more particularly, to the tilt type of such trailers in which the front portion of the bed frame structure is pivotally connected to the rear portion of the tongue means so that the front portion of the bed frame structure may be tilted upwardly to permit the boat cradled thereon to slide off to the rear.

A general object of the invention is to provide such a trailer with unloading means of simple and unique structure which is economical to construct and easily installed that effectively eliminates the need for costly and elaborate mechanism to lift relative to the tongue means the front end portion of the loaded trailer bed structure to tilt the latter for permitting the boat load to slide back off of it.

A more specific object of the invention is to provide such a trailer in an economical manner with a simple and foolproof supplemental means which may employ readily the power of a cable winch, usually mounted on the tongue means for hauling a boat out of the water up onto the tilted bed frame structure, to lift the bow of the loaded boat relative to the tongue means and overbalance it and the bed frame structure for backward tilt and attendant unloading, such unloading means also uniquely applying rearward thrust upon the boat to push it back as its bow is lifted.

A further object of the invention is to provide a structural embodiment of the device which is readily constructed and installed at relatively low cost and which permits efficient and simple use and operation thereof.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 3 is another side perspective view, with parts broken away and in section, of structure shown in FIG. 2, illustrating a further step in the unloading operation; and FIG. 4 is an enlarged plan view of an embodiment of the unloading device of the present invention.

Prior to the present invention, tilt type boat trailers have been provided with elaborate and costly devices including mechanism to lift the front end portion of the trailer bed frame structure relative to its hauling tongue to tilt the trailer bed and its boat load backwards to permit the boat to slide off into the water. These devices have employed various elaborate and relatively expensive means to accomplish this end, such as hydraulic operators, cam actions, lead screws, etc. Some of these costly devices assure launching of even relatively large boats in a manner which may be acceptable, even when being accomplished under trying conditions of very gentle sloping of the ramp or shore bottom. However, many tilt bed boat trailers in service are not so elaborately equipped and launching therefrom frequently requires considerable exertion to obtain the necessary unloading bed tilt of an excessive degree causing rapid travel of the boat into the water, frequently resulting in excessive splash and attendant wetting of the transom well. These and other difficulties have been efficiently eliminated by the simple appliance of the present invention which can be easily attached to existing conventional boat trailer structures of the tilt bed type.

Figure 1:
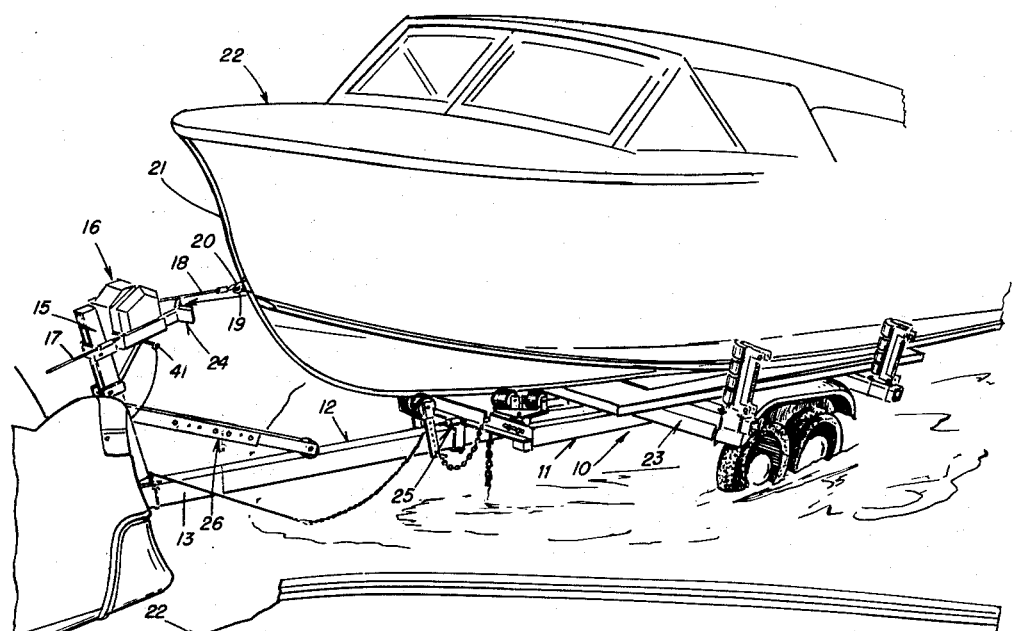
FIG. 1 is a perspective view, with parts broken away and depicted in phantom, showing a boat trailer of typical construction hitched to the rear end of an automobile for hauling it, with a boat being hauled up onto the trailer bed in a position closely approaching its final loaded location, the trailer being shown equipped with unloading means of the present invention.

Referring to the drawings, in which like numerals identify similar parts throughout, it will be seen from FIG. 1 that a tilt bed type of trailer, which may be of conventional construction, depicted at 10, includes a wheel-supported, boat-cradling, bed frame structure 11 having draft tongue means 12 pivotally connected in a usual manner to the bed frame structure so as to permit the front end of the latter to be tilted upwardly relative to the tongue means. The forward portion 13 of the tongue means is hitched or coupled in the usual manner to the rear end 14 of an automobile for hauling. The forward portion 13 of the tongue means is also provided in conventional manner with an upstanding winch stand or post 15 upon which may be mounted a power source winch means 16 of any desired type, such as a hand-operated or motor driven cable winch. In FIG. 1, the winch means 16 is of the electrically-operated type, such as that disclosed in my copending patent application Serial No. 12,360, filed March 2, 1960. Such cable winch 16 includes an electric motor supplied with electrical power by means of cable 17 leading to the car battery, and the winch reel has wound thereabout a hauling cable 18 preferably provided on its free end with an engaging hook 19.

Figure 2:
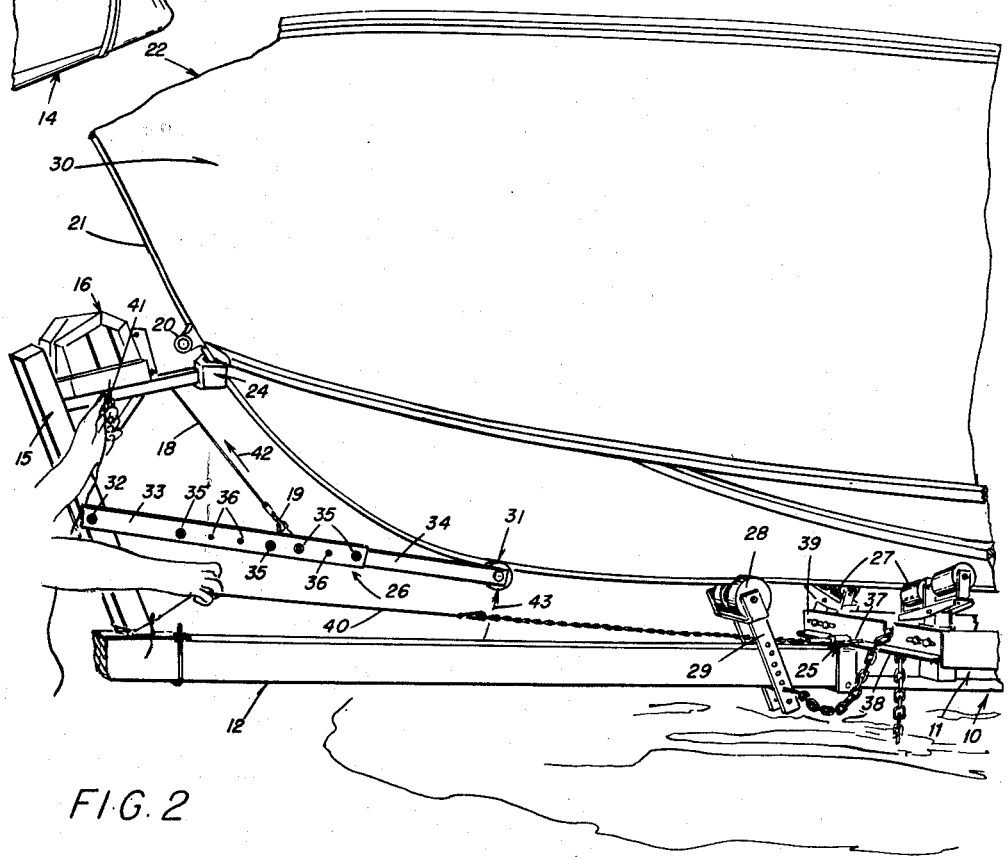
FIG. 2 is a side perspective view to larger scale, with parts broken away and in section, showing the bow portion of a loaded boat being engaged by the present unloading device to lift the boat bow relative to the trailer tongue for overbalancing backward tilt of the boat and trailer bed and apply rearward push thereto to launch the boat.

In FIG. 1 the winch cable 18 is shown connected by its hook 19 to the leading eye 20 on the forward, upwardly-curved portion of the keel 21 of boat 22. The loading operation has been almost completed in the FIG. 1 pictorial representation, and thus the load of the boat has been so distributed along the trailer bed structure 11 as to overbalance the forward end thereof about the transverse axis provided by the wheeled truck 23 and substantially align it with the hauling tongue 12. With completion of the loading operation, the bow portion of the keel 21 will be snugged to abutment of bow stop or fork 24. In such aligned relative positions of the bed frame structure 11 and the tongue 12, a suitable latch 25 upon the latter engages the former to hold them in such relative positions for safe hauling of the boat along the highways. An embodiment of the unloading device of the present invention is illustrated at 26, and will be described in detail in connection with FIGS. 2, 3 and 4.

Assume that the loaded trailer 10 has been hauled to water and backed down the sloping shore to place the wheels of the truck in shallow water. The hull of boat 22 is securely supported by the front cradle rolls 27 carried by the front portion of the bed frame 11 and suitable cradling means at the rear end of the latter (not shown), as well as by a keel roller 28 supported by a bracket 29 upon the tongue 12. In this fully loaded position of the boat 22, the upwardly curved bow portion of the keel 21 is abutted in the fork of bow stop 24. Whatever means had been employed to tie or secure the boat in this loaded position, such as by connection to the leading eye 20, is freed to permit the unloading operation.

The embodiment of the unloading device of the present invention depicted at 26 is power operated and so designed to lift relative to the tongue 12 the bow 30 of the boat loaded on the bed frame structure 11, so as to tilt the front end of the latter upwardly and allow the boat to slide back off of it into the water. Such power operated unloading device 26 may be in the form of lever means suitably pivotally supported for upward swing by the forward portion 13 of the tongue 12, and it has a boat bow-lifting portion 31 which is movable upwardly by upward lever swing to lift the boat bow 30. The lever means 26 preferably is in the form of a third class lever having its front end pivotally supported at 32 upon the winch stand or post 15, and the boat bow-lifting portion 31 on its back end preferably is in the form of a freely rotatable roller, which, as will be seen from FIG. 4, may be spool-shaped or grooved for secure engagement of the keel 21 (depicted in dotted lines therein).

Since the embodiment of the unloading device 26 depicted in the drawings is to be readily adapted for mounting upon various conventional trailer structures which differ in dimensions of parts, it is preferably made longitudinally adjustable readily to accommodate it to these different trailers. Thus, it may be formed to include a pair of laterally-spaced elongated side straps 33 pivotally connected at 32 to opposite sides of the winch post 15, and another pair of laterally-spaced elongated straps 34 received between the previously-mentioned straps and suitably bolted thereto by a plurality of tie bolts 35 receivable through selected pairs of aligned holes 36 in the two pairs of elongated side straps. Thus, the unloading lever arm 26 is readily adjustable in length. Also one of the tie bolts 35 may serve as means to connect the power source or winch cable to lever arm 26 between its pivotal mount at 32 and its bow-lifting portion at 31, since the cable end engaging hook 19 may be readily hooked about the selected tie bolt.

The previously-mentioned latch 25 which keeps the trailer bed frame structure 11 temporarily aligned with the tongue 12 may be of conventional form having a spring-biased bolt 37 engaged above a lip or transverse flange 38 of frame front cross member or angle 39. A suitable pull cable 40 is attached to the latch bar 37 so that the latter may be retracted for permitting the frame lip or transverse flange 38 to swing up therepast and allow backward tilt of the bed frame structure 11.

To effect launching of the boat 22 by unloading it from the trailer bed structure 11, let it be assumed that the operator has hooked the cable end hook 19 about one of the transverse tie bolts 35 of unloading lever arm 26. With one hand he may pull on the unlatching cable 40 and with the other hand trip the winch motor switch at 41 to effect pull on the cable 18 upward in the direction of the arrow 42, depicted in FIG. 2. As a result, the back end of the lever arm 26 will be swung upwardly in the direction of the arrow 43 until the roller at 31 engages the boat keel 21. Continued operation of the winch 16 causes the back end of the lever arm 26 to be progressively raised so as to lift the boat bow 30 in the direction of the arrow 44 in FIG. 3, finally overbalancing the boat and trailer bed structure 11, tilting the latter back to the position depicted in FIG. 3 so that the boat may slide black or glide easily off of the cradle rolls 27 and ultimately gently into the water from the tilted trailer bed.

In FIG. 3 the pivotal connection by a transverse pivot pin or bolt to the front portion of the trailer bed frame structure 11 is indicated at 45. And for this purpose, the bed frame structure may include a longitudinally-extending inverted channel 46 in which the back end 47 of tongue 12 is received and pivotally connected thereto by the cross pin or bolt at 45. If desired, a conventional snub chain 48 may be provided to limit this backward tilting of the bed frame structure 11 relative to the tongue 12, and the latter may also be equipped with the usual adjustable parking wheel 49.

It will thus be understood that by providing conventional trailer structure with the unloading device of the present invention, such as in the form of the power-operated third class lever 26, one may easily unload a boat from the trailer bed 11 simply by first freeing safety binding which secures the boat upon the trailer, then connecting the power winch cable 18 to this unloading lever arm, thereafter freeing the latch 25 to permit the trailer bed frame structure 11 to tilt backward, and operating the winch 16 to swing the back end 31 of the lever arm upwardly to lift the boat bow 30 and effect the simultaneous tilting of the boat hull and trailer bed. After the trailer bed has been tilted backward, such as to the position depicted in FIG. 3, the operator may then trip the winch motor switch 41 and with pull applied to a bow line 50 the boat will steadily glide back off of the trailer bed. Unloading glide of the boat 22 back off of the trailer bed 11 is caused both by the force of gravity and also by push against the upwardly curved and forwardly sloping bow portion of the keel 21 as the lever arm roller 31 is raised thereagainst, i.e., it is cammed rearward. Thus the boat is easily launched in a controlled and safe manner. Obviously, the simultaneous lift of the boat bow and push backward of the hull by the present device does not depend upon roller engagement of keel surfaces, since like action can be attained if unloading lever rollers engage the upwardly extending and forwardly sloping hull surfaces on opposite sides of the bow portion of the keel. It will also be seen that the usual cable winch which is employed to haul the boat out of the water back upon the trailer provides the power for operating the unloading device of the present invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

Having described my invention, what I claim as new and desire to secure by Letters Patent is:

1. In a tilting bed boat trailer, unloading means comprising in combination with a wheel-supported, boat-cradling, bed frame structure adapted to be disposed under and support the medial portion of the cradled hull of a boat of the type having a tapered bow portion defined in part by upwardly extending and forwardly sloping surfaces and with the bow portion extending forward beyond the front end of the frame structure, draft tongue means having a back end adapted to be located beneath the bow portion of the cradled boat hull and pivotally connected to the front portion of said bed frame structure to permit the latter to be tilted upwardly relative to a forward portion of said tongue means, and power source winch means mounted on said tongue means forward of its pivoted back end; of lever means pivotally supported for upward swing by the forward portion of said tongue means, a boat bow-lifting portion carried by and movable upwardly by upward lever swing having means slidably to engage the upwardly extending and forwardly sloping surfaces of the hull bow portion, and means to connect said lever means to said winch for upward swing by the latter to move said bow-lifting portion upwardly for slidable engagement of and along the upwardly extending and forwardly sloping surfaces of the hull bow portion to lift the boat bow and apply rearward push to the boat hull to overbalance the boat load of and tilt upwardly the front portion of said bed frame structure allowing the boat to slide back off of the latter.

2. In a tilting bed boat trailer, unloading means comprising in combination with a wheel-supported, boat-cradling, tiltable bed frame structure, draft tongue means having a back end pivotally connected to the front portion of said bed frame structure to permit the latter to be tilted upwardly relative to a forward portion of said tongue means, an upwardly-extending winch-supporting post on the forward portion of said tongue means, and a power source cable winch mounted on a top portion of said post; of a lever arm of the third class having a rearwardly-extending back end and a forward end pivotally supported on said post below said winch-supporting top portion of the latter for upward swing of its back end, a boat bow-lifting element carried by said lever back end in the form of a keel-engaging and guiding freely rotatable circumferentially grooved roller, and means on said lever arm between its ends to connect thereto a winch cable extending down from said winch for lift of said lever back end.

3. In a tilting bed boat trailer, unloading means comprising in combination with a wheel-supported, boat-cradling, bed frame structure adapted to be disposed under and support the medial portion of the hull of a boat of the type having a tapered bow portion defined in part by upwardly extending and forwardly sloping keel surfaces and with the bow portion extending forward beyond the front end of the frame structure, draft tongue means having a back end adapted to be located beneath the bow portion of the cradled boat hull and pivotally connected to the front portion of said bed frame structure to permit the latter to be tilted upwardly relative to a forward portion of said tongue means, and power source winch means mounted on said tongue means forward of its pivoted back end; of lever means of the third class having a front end pivotally supported by the forward portion of said tongue means for upward swing of its back end and with the latter extending back toward said bed frame structure, a boat bow-lifting portion carried by and movable upwardly by the back end of said lever means upon upward lever swing, said boat bow-lifting portion including a freely rotatable spool-shaped roller having enlarged end flanges engageable of the upwardly curved and forwardly sloping keel surfaces with guiding engagement of side portions of the latter by said roller end flanges for movement therealong, and means to connect an intermediate portion of said lever means between its pivoted front end and its upwardly swingable back end to said winch for upward swing by the latter to swing said roller upwardly to engagement of the upwardly extending and forwardly sloping keel surfaces to lift the boat bow and apply rearward push to the boat hull to overbalance the boat load of and tilt upwardly the front portion of said bed frame structure and allow the boat to slide back off of the latter.

References Cited in the file of this patent

UNITED STATES PATENTS

| | | |
|---|---|---|
| 328,793 | Leonhardt | Oct. 20, 1885 |
| 2,711,259 | Jones | June 21, 1955 |